(12) United States Patent
Sudo

(10) Patent No.: US 7,162,545 B2
(45) Date of Patent: Jan. 9, 2007

(54) DUPLEXED PROCESSOR SYSTEM

(75) Inventor: Hirofumi Sudo, Tokyo (JP)

(73) Assignee: NEC Corporation, Tokyo (JP)

( * ) Notice: Subject to any disclaimer, the term of this patent is extended or adjusted under 35 U.S.C. 154(b) by 521 days.

(21) Appl. No.: 10/400,336

(22) Filed: Mar. 27, 2003

(65) Prior Publication Data

US 2003/0188126 A1    Oct. 2, 2003

(30) Foreign Application Priority Data

Mar. 28, 2002 (JP) ............................. 2002-090144

(51) Int. Cl.
*G06F 15/16* (2006.01)
(52) U.S. Cl. ...................... 709/400; 709/201; 709/202; 713/375
(58) Field of Classification Search ................. 709/400
See application file for complete search history.

(56) References Cited

U.S. PATENT DOCUMENTS 6,377,979 B1 *  4/2002  Yamashita et al. .......... 709/213

6,446,058 B1 *  9/2002  Brown .......................... 706/60
6,788,648 B1 *  9/2004  Peterson ...................... 370/252

OTHER PUBLICATIONS

Ono, Kazuya et al., "Development of Control Processor for Switching Node", Communications Society, 2001, p. 130.

* cited by examiner

*Primary Examiner*—Lynne H. Browne
*Assistant Examiner*—Michael J. Brown
(74) *Attorney, Agent, or Firm*—Muirhead & Saturnelli, LLC

(57) ABSTRACT

A high-performance and miniaturizable duplexed processor system is provided. In communications between respective corresponding processor units on 0- and 1-system processor cards C0 and C1, a sequence number is added to transmission data to assess the continuity of the transmission data, and to thereby retransmit missing data. Also, in communications between processor units on the same processor card, interprocessor connection units PC0 and PC1 autonomously transfer data. Furthermore, each processor card is equipped with an input/output unit (an input/output switching unit and an input/output interface unit), so that each input/output switching unit IC0 and IC1 switches input data paths according to operating states of the processor card equipped therewith.

9 Claims, 10 Drawing Sheets

DUPLEXED PROCESSOR SYSTEM

BACKGROUND OF THE INVENTION

1. Field of the Invention

The present invention relates to a duplexed processor system and, in particular, to a duplexed processor system whose each processor card is equipped with a plurality of processor units.

2. Description of the Related Art

Generally, in a duplexed processor system configured to attain high availability of communications equipment and the like, a processor card equipped with a high-speed processor is separated from an input/output unit, and active- and standby-system processors are connected by buses and the like, so that respective memory contents of the active- and standby-system processors agree with each other. In recent years, it has been required that such a duplexed processor system be enhanced in processor performance, reliability of communications mechanism between mates, function of one card and space factor.

In order to meet such requirements, a duplexed processor system has been disclosed in, for example, "NODE CONTROL PROCESSOR (Denshi Tsushin Gakkai, 2001 Society Taikai, B-6-74)", in which built-in high-speed processors are equipped, a communications mechanism between mates is enabled by serial links added with ECC (error correction codes), and cross interfaces to input/output cards are provided.

The configuration of the duplexed processor system disclosed in the above literature is shown in FIG. 1. In FIG. 1, reference characters CP0 and CP1 are central processing units; reference characters MC0 and MC1 are other system processor connection units; reference characters MM0 and MM1 are main memories; reference characters B00, B01, B10, and B11 are bus interface units; and reference characters FM0 and FM1 are input/output interface units. Each respective processor unit of 0- and 1-system processor cards C0 and C1 comprises the central processing unit, the other system processor connection unit, and the main memory. The other system processor connection units MC0 and MC1 transfer data between the 0- and 1-system processor units, so that respective contents of the memories MM0 and MM1 agree with each other. The data transfer uses the ECC to cope with an occurrence of data error, and to thereby prevent disagreement between the contents of the memories MM0 and MM1.

Also, the input/output unit of the system is redundantly duplexed by a cross bus BS0 connecting the 0-system processor card C0 and input/output card C3 and by a cross bus BS1 connecting the 1-system processor card C1 and input/output card C2.

However, there is the drawback that, in the communications between mates (i.e. the communications between the 0- and 1-system processor units), an occurrence of data error uncorrectable by ECC causes other system disconnection, simplex running operation, and availability reduction. Also, there is the drawback that, as shown in FIG. 1, configuring the duplexed processor system requires at least four cards, which has difficulty in the application to space-saving equipment.

Also, there is the drawback that in the case of the execution of application software requiring processor power, each processor card equipped with one processor causes incomplete computation within a fixed time, which consequently cannot assure operation as communications equipment to which the duplexed processor system is applied. This drawback may be overcome by employing a duplexed multiprocessor system as the duplexed processor system. For example, in the case of the employment of a duplexed multiprocessor system whose each processor card is equipped with a plurality of processor units each comprising a CPU, an other system processor connection unit, and a main memory, the communications between the processor units on the same card are required so as to reduce the load of each processor unit, thereby enhancing system performance.

SUMMARY OF THE INVENTION

An object of the present invention is to provide a high-performance and miniaturizable duplexed processor system.

The foregoing and other objects of the present invention are achieved by a duplexed processor system for transferring data between processor units each mounted in 0- and 1-system processor cards so that respective memory contents of the processor units agree with each other, wherein each of the processor units comprises: information addition means for adding information to transmission data to the processor unit of the other system to assess the continuity of the transmission data; information detection means for detecting the information added to reception data from the processor unit of the other system; notification means for transmitting a reception completion notification of the information detected by the information detection means to the processor unit of the other system; and transmission control means for controlling data transmission to the processor unit of the other system in response to the reception completion notification from the processor unit of the other system.

In the duplexed processor system, the transmission control means controls the data transmission to the processor unit of the other system, so as to retransmit missing data thereto in the case of the assessment of the presence of missing data in response to the reception completion notification from the processor unit of the other system.

In the duplexed processor system, each of the processor units comprises memory means for storing the transmission data to the processor unit of the other system; and the transmission control means updates a read location of the memory means for retransmission in the case of the assessment of the absence of missing data in response to the reception completion notification from the processor unit of the other system, while reads data stored in the memory means from the read location for retransmission so that it is transmitted to the processor unit of the other system in the case of the assessment of the presence of missing data in response to the reception completion notification from the processor unit of the other system.

In the duplexed processor system, each of the 0- and 1-system processor cards is equipped with a plurality of the processor units, and data is transferred between each of said plurality of said processor units and said processor units of the other system corresponding one-to-one therewith so that respective memory contents of these processor units agree with each other.

In the duplexed processor system, interprocessor communications means is provided for each of the 0- and 1-system processor cards, and autonomously transfers data between the processor units of the self-system in response to a data transfer command stored in a specified region of each respective memory of the processor units of the self-system.

In the duplexed processor system, the interprocessor communications means comprises: transfer means for being provided corresponding to each of the processor units of the self-system, autonomously reading the data transfer command stored in the memory of the corresponding processor unit, autonomously reading and transferring data stored in the memory in response to the data transfer command; and reception means for being provided corresponding to each of the processor units of the self-system, and autonomously writing the received transfer data to the memory of the corresponding processor unit.

In the duplexed processor system, a transmission register and a reception register are provided corresponding to each of the processor units of the self-system for each of the 0- and 1-system processor cards, and respective regions of the transmission and reception registers are divided into regions indicative of the respective processor units of the self-system, and wherein data written by the processor unit to a divided region of the transmission register corresponding thereto is written to a region indicative of the processor unit that write to the transmission register the data of the reception register corresponding to the processor unit indicated by the region to which the data is written.

In the duplexed processor system, an input/output unit is provided for each of the 0- and 1-system processor cards, and switches paths of data input from the processor units of the self-system, the input/output unit of the other system, and outside of the system, according to operating states of the processor card of the self-system.

In the duplexed processor system, each of the input/output units comprises: selection means for selecting one input data from data input from the processor units of the self-system and from the outside of the system according to operating states of the processor card of the self-system, and outputting it to the input/output unit of the other system; selection means for selecting one input data from data input from the processor units of the self-system and from the input/output unit of the other system according to operating states of the processor card of the self-system, and outputting it to the outside of the system; and selection means for selecting one input data from data input from the outside of the system and from the input/output unit of the other system, and outputting it to the processor units of the self-system.

In effect, in the communications between the processor units each mounted in the 0- and 1-system processor cards, the transmission side adds information to transmission data to assess the continuity of the transmission data, while the reception side detects the information added to reception data, and notifies a reception completion notification of the detected information to the transmission side, thereby enabling the transmission side to know missing data in the transmission data, and to retransmit the missing data and subsequent data. Accordingly, the reliability of the communications between the processor units each mounted in the 0- and 1-system processor cards can be enhanced.

Also, in the communications between a plurality of processor units on the same processor card, the interprocessor communications means autonomously transfers data between the processor units on the basis of a data transfer command stored in the memory of each processor unit. Also, the respective regions of transmission and reception registers provided corresponding to each of a plurality of processor units on the same processor card are divided into regions indicative of the respective plurality of processor units on the same processor card, so that data written to the transmission register is written to the reception register provided corresponding to the processor unit indicated by the region to which the data is written. Also, the data written to the reception register is then written to the region indicative of the processor unit that writes the data to the transmission register. Accordingly, the load of each processor unit due to the interprocessor communications on the same processor card is reduced, thereby enabling enhancement in processing capability of each processor unit.

Also, each processor card is equipped with the duplexed input/output unit in the duplexed processor system, so that each input/output unit switches input data paths according to operating states of the processor card equipped therewith. Accordingly, miniaturization is enabled compared to the prior-art duplexed processor system whose input/output unit is separated from the processor card.

BRIEF DESCRIPTION OF THE DRAWINGS

Preferred embodiments of the present invention will hereinafter be described with reference to the accompanying drawings, wherein.

DETAILED DESCRIPTION OF THE PREFERED EMBODIMENTS

Figure 2:
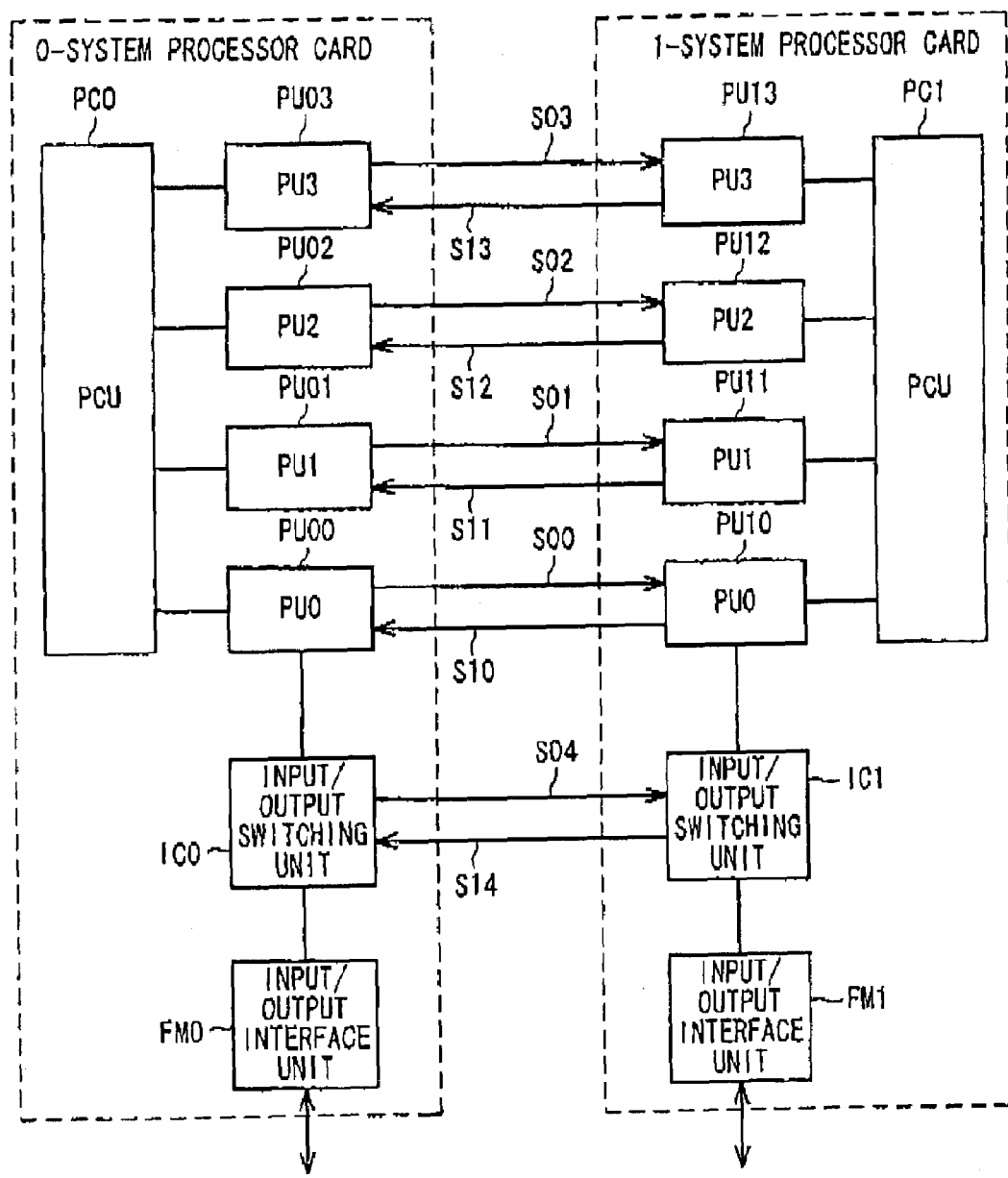
FIG. 2 is a diagram showing a configuration of a duplexed multiprocessor system in accordance with an embodiment of the present invention.

FIG. 2 is a diagram showing a configuration of a duplexed multiprocessor system in accordance with the present invention. Referring to FIG. 2, a 0-system processor card C0 is equipped with four processor units PU00, PU01, PU02, and PU03, an interprocessor connection unit (an interprocessor communications unit) PC0, and an input/output unit comprised of an input/output switching unit IC0 and an input/output interface unit FM0. Likewise, a 1-system processor card C1 is equipped with four processor units PU10, PU11, PU12, and PU13, an interprocessor connection unit (an interprocessor communications unit) PC1, and an input/output unit comprised of an input/output switching unit IC and an input/output interface unit FM1.

Figure 1:
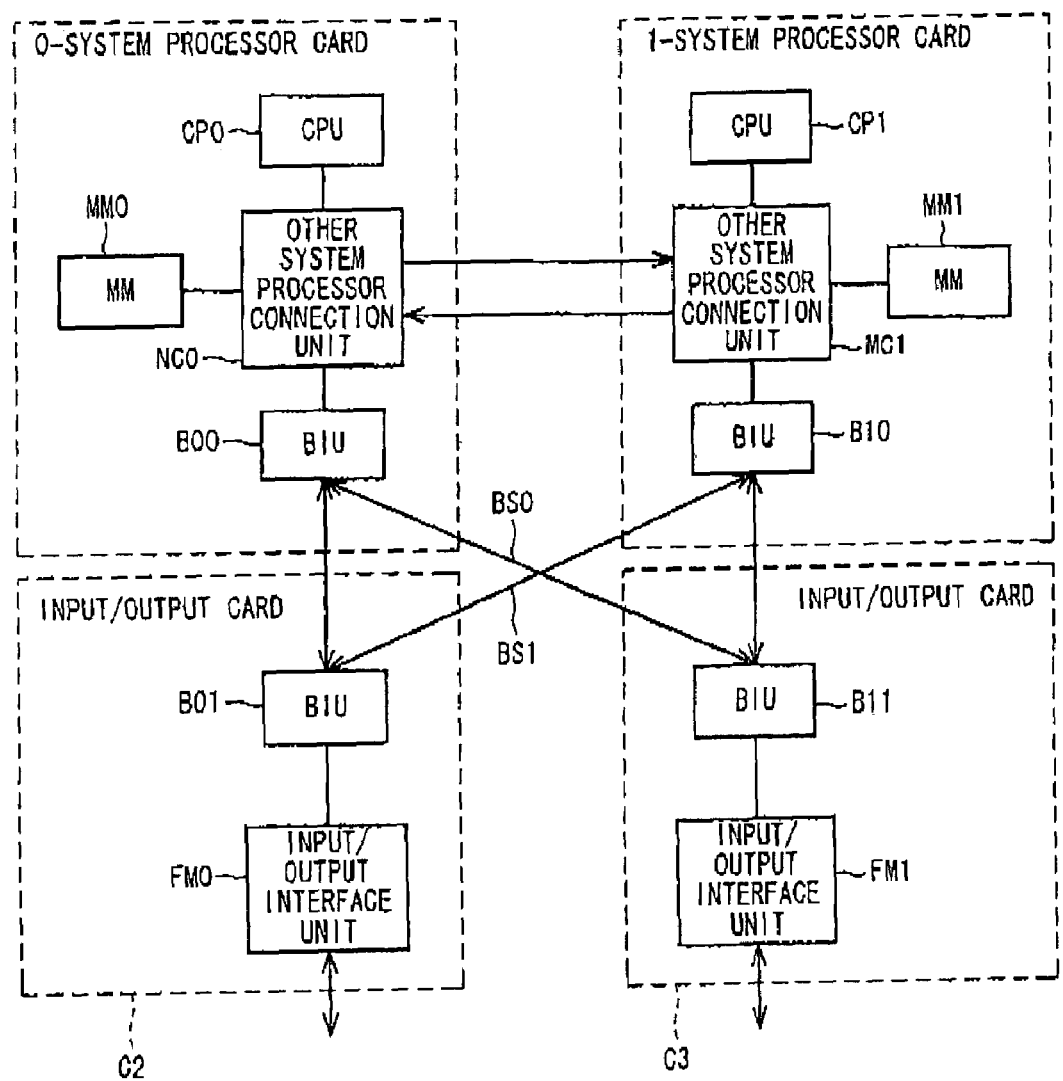
FIG. 1 is a diagram showing a configuration of a prior-art duplexed processor system.

Each processor unit comprises a CPU, an other system processor connection unit, and a main memory, as the simplest configuration, as in FIG. 1. The 0-system processor unit PU00 corresponds to the 1-system processor unit PU10; the 0-system processor unit PU01 corresponds to the 1-system processor unit PU11; the 0-system processor unit PU02 corresponds to the 1-system processor unit PU12; and the 0-system processor unit PU03 corresponds to the 1-system processor unit PU13. Thus, transferring data in the one-toone correspondences between the processor units enables respective memory contents of these processor units to agree with each other.

The interprocessor connection units PC0 and PC1 are for communications between the processor units on the same processor card. The input/output switching unit IC0 is connected to the processor unit PU00, the input/output interface unit FM0, and the input/output switching unit IC1, and switches input data paths according to the operating states of the 0-system processor card. The input/output switching unit IC1 is connected to the processor unit PU10, the input/output interface unit PM1, and the input/output switching unit IC0, and switches input data paths according to the operating states of the 1-system processor card. Also, the input/output interface units FM0 and FM1 may be a memory such as a flash memory.

Figure 3:
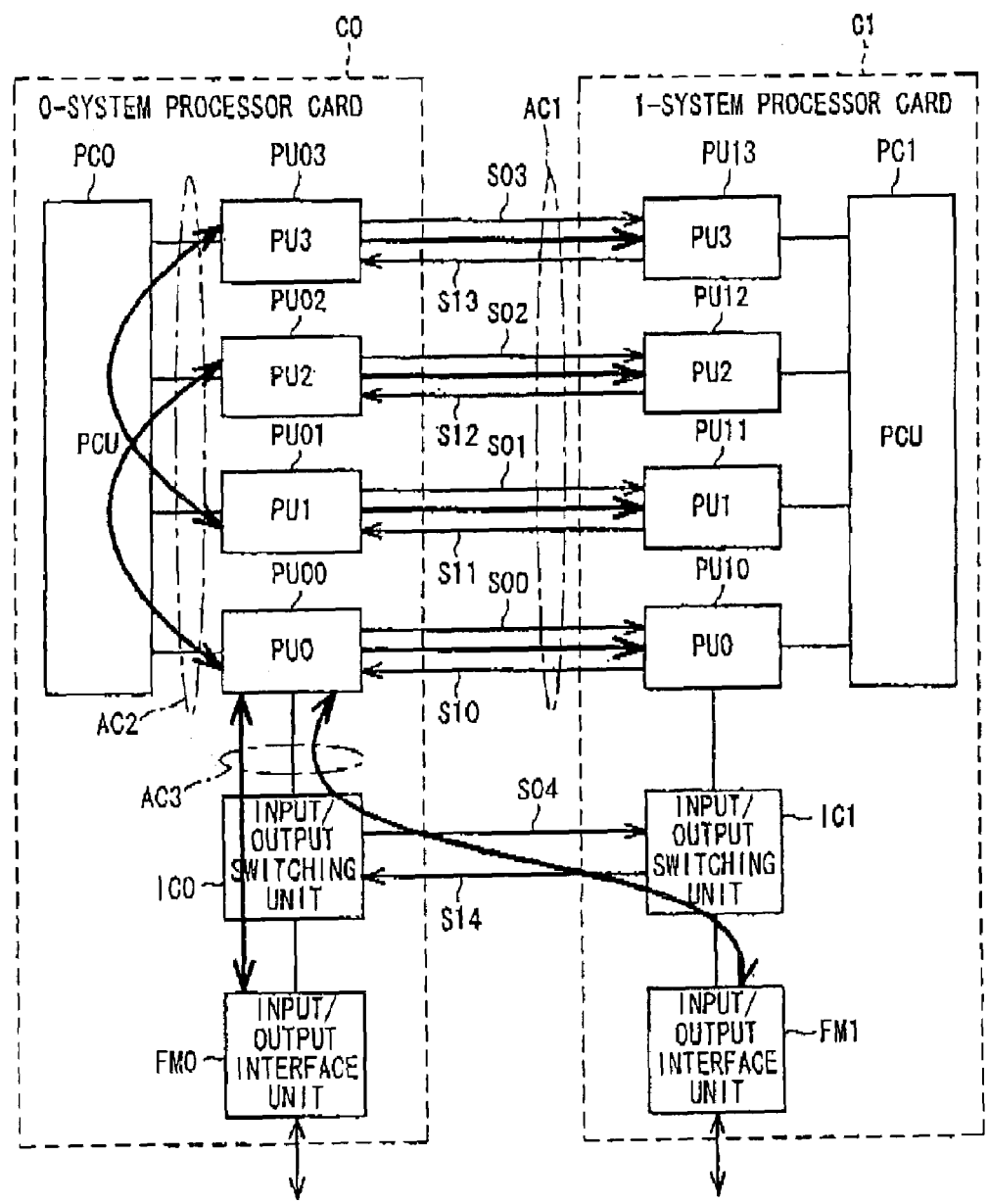
FIG. 3 is a diagram showing an example of data paths in the duplexed multiprocessor system of FIG. 2.

FIG. 3 shows an example of data paths in the duplexed multiprocessor system shown in FIG. 2. The four processor units on each processor card operate independently of one another, and transfer data to the respective corresponding processors of the other system via the respective independent data paths, so that the memory contents of each processor agree with the memory contents of the corresponding processor. This example of the data paths is indicated in AC1 of FIG. 3.

Figure 4:
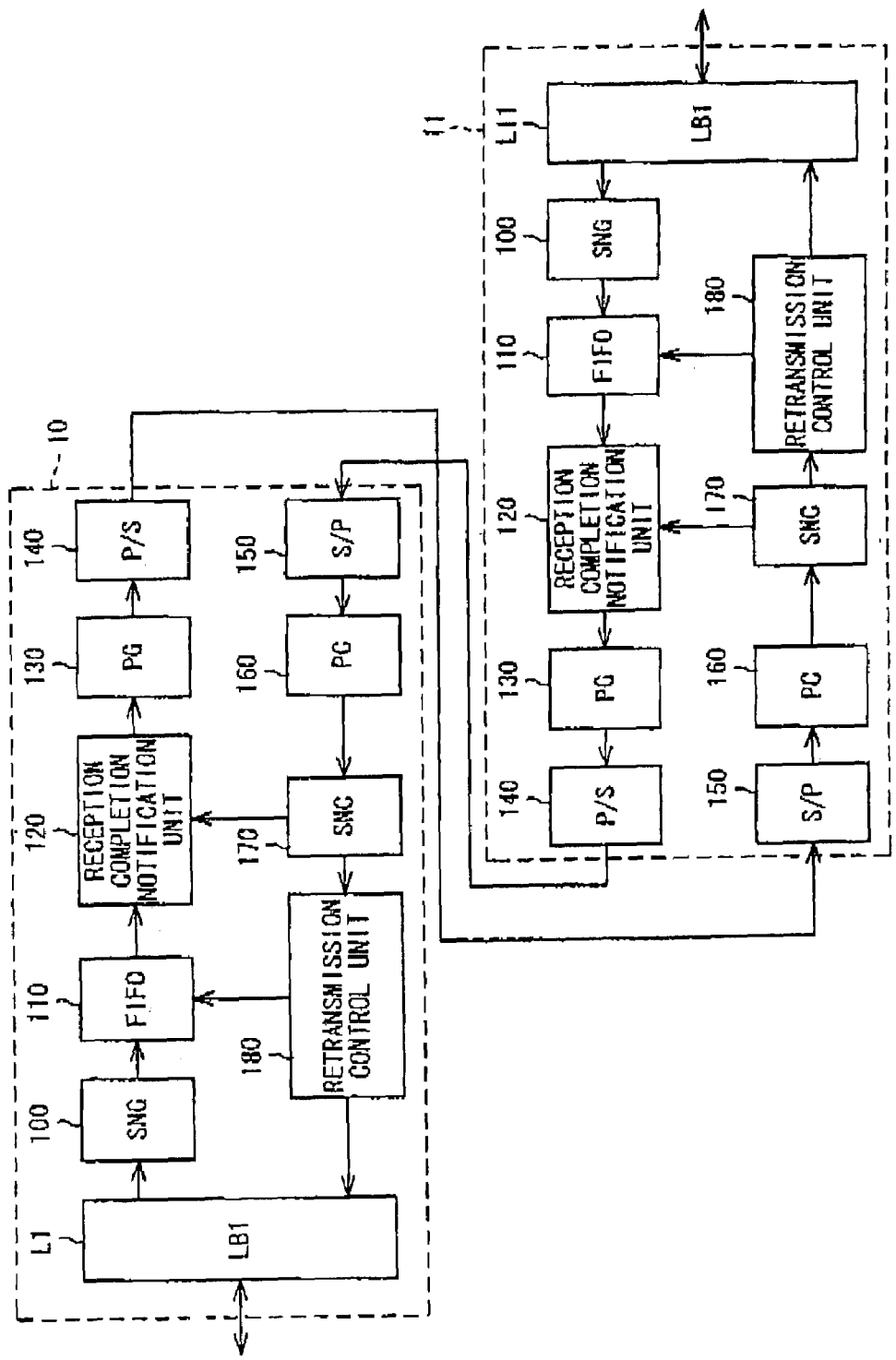
FIG. 4 is a diagram showing a configuration of an other system processor connection unit within each processor unit of FIG. 2.

FIG. 4 is a diagram showing a configuration of an other system processor connection unit (see FIG. 1) within each processor unit of FIG. 2. In FIG. 4, an other system processor connection unit 10 is within each processor unit on the 0-system processor card C0, while an other system processor connection unit 11 is within each processor unit on the 1-system processor card C1. Each of the other system processor connection units includes a local bus interface L1, a sequence number adding unit 100, a FIFO buffer memory 110, a reception completion notification unit 120, a parity generation unit 130, a parallel/serial conversion unit 140, a serial/parallel conversion unit 150, a parity checking unit 160, a sequence number checking unit 170, and a retransmission control unit 180. The sequence number adding unit 100 adds a sequence number to data input to the local bus interface L1 to assess the continuity of the data, and outputs to the FIFO buffer memory 110. The parity generation unit 130 adds a parity bit to the data from the reception completion notification unit 120, and outputs to the parallel/serial conversion unit 140. The parallel/serial conversion unit 140 performs a parallel/serial conversion on the data from the parity generation unit 130, and outputs to a serial link. If the other system processor connection units 10 and 11 are, for example, within the processor units PU00 and PU10, respectively, of FIG. 2, then the above serial link refers to serial links S00 and S10.

The serial/parallel conversion unit 150 performs a serial/parallel conversion on the data from the serial link, and outputs to the parity checking unit 160. The parity checking unit 160 performs a parity checking on the data from the serial/parallel conversion unit 150, and outputs the correct data to the sequence number checking unit 170, while discarding the wrong data. The sequence number checking unit 170 detects the sequence number added to the data from the parity checking unit 160, and delivers the detected sequence number to the reception completion notification unit 120, while outputting the data from the parity checking unit 160 to the retransmission control unit 180.

The reception completion notification unit 120 adds to the data from the FIFO buffer memory 110 a notification of the completion of the reception of the sequence number detected by the sequence number checking unit 170, and outputs to the parity generation unit 130, thereby notifying the completion of the reception of the sequence number added data to the other system (i.e. the data transmission source). The retransmission control unit 180 controls the data transmission to the other system on the basis of the reception completion notification information added to the data from the sequence number checking unit 170. More specifically, the retransmission control unit 180 controls a read retry pointer of the FIFO buffer memory 110 on the basis of the reception completion notification information added to the data from the sequence number checking unit 170.

Figure 5:
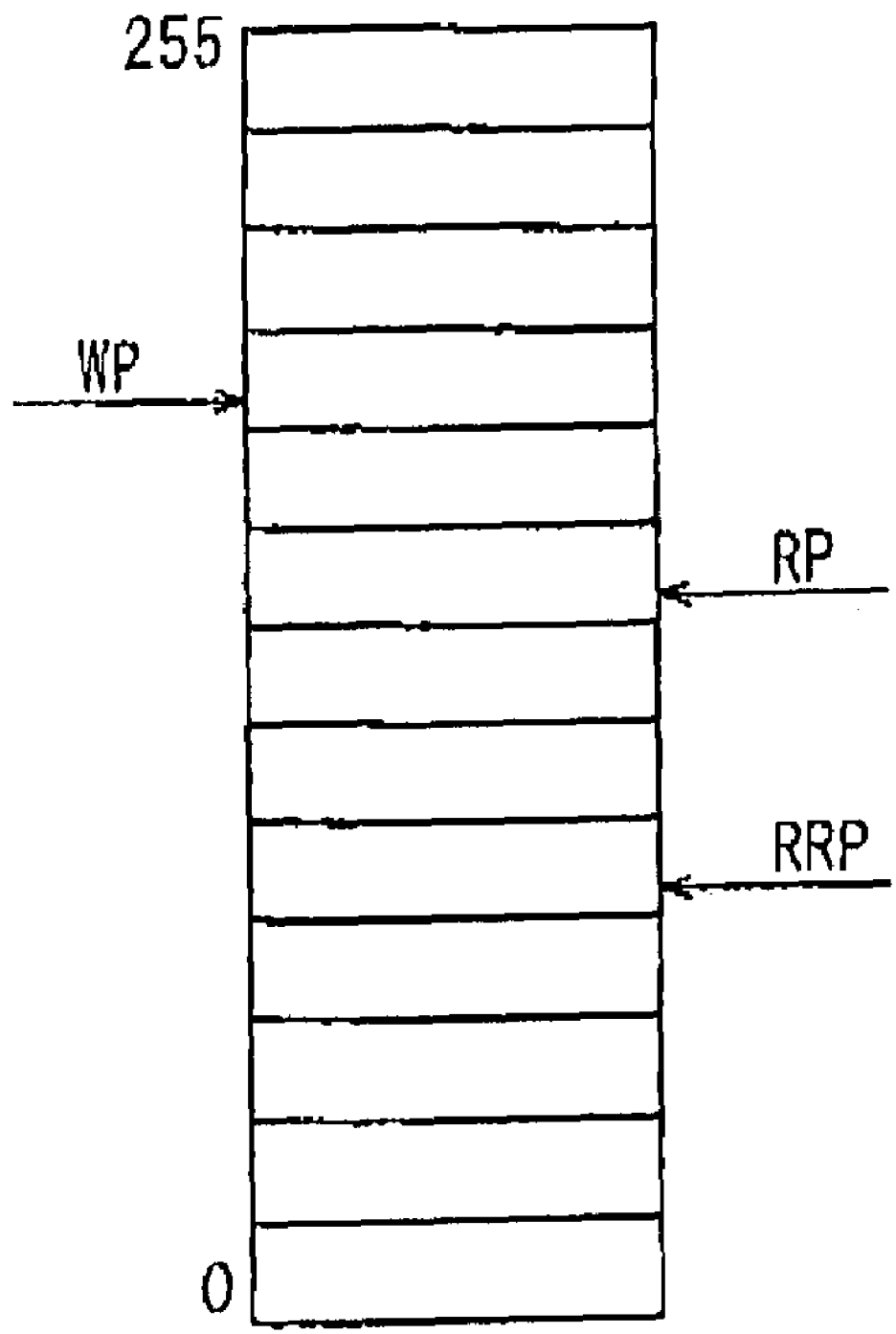
FIG. 5 is a diagram for explaining a buffer memory of FIG. 4.

The read retry pointer of the FIFO buffer memory 110 is explained using FIGS. 5 and 4. As shown in FIG. 5, the FIFO buffer memory 110 comprises, say, 256 levels, and a writing to the FIFO buffer memory 110 is performed at an address indicated with a write pointer (WP), so that the write pointer is updated (advances one level) after the writing. Also, a reading to the FIFO buffer memory 110 is performed at an address indicated with a read pointer (RP), so that the read pointer is updated (advances one level) after the reading.

Such writing and reading is the same as in the ordinary FIFO buffer memory, but a read retry pointer (RRP) is used as the third pointer so as to enable a retransmission function to retransmit missing data on the basis of the reception completion notification information. The retransmission control unit 180 receives the data from the sequence number checking unit 170 and, on the basis of the reception completion notification information added thereto and of the preceding reception completion notification information, assesses whether or not there is missing data in the received data in the other system processor unit. In the case of the assessment of the absence of missing data, the retransmission control unit 180 updates (advances one level) the read retry pointer of the FIFO buffer memory 110.

In the case of the assessment of the presence of missing data, on the other hand, the retransmission control unit 180 switches a read address of the FIFO buffer memory 110 from the read pointer to the read retry pointer to read data from an address indicated with the read retry pointer. After this reading, the retransmission control unit 180 updates the read retry pointer, and reads data from an address indicated with the updated read retry pointer.

Such control by the retransmission control unit 180 permits data retransmission from the not received missing data (including detected data errors) in the other system processor unit, so as to continue normal running without disconnecting the other processor card during the fault occurrence, thereby enabling high reliability communications. Also, with no need to use lengthy ECC processing, simple error detection codes such as parities can be used, thereby ensuring reduction in circuit scale, processing time and delay time.

Further, each pointer of the FIFO buffer memory 110, after reaching the 255th level, counts up from 0 again. Also, there are a FIFO full state and a FIFO empty state as states indicative of the operations of the FIFO buffer memory 110. As illustrated in FIG. 5, since the read retry pointer is provided, the FIFO full state is defined as a state where the write pointer catches up with the read retry pointer and the difference between the read retry and write pointers becomes 1, while the FIFO empty state is defined as a state where the read pointer catches up with the write pointer and the difference between the write and read pointers becomes 1.

Also, although the sequence number adding unit 100 generates and adds a sequence number to transmission data, the assessment of the continuity of the transmission data has only to be made. Therefore, for example, an address indicated with the read pointer of the FIFO buffer memory 110 may be used as the sequence number. Since the read pointer counts up sequentially, the continuity of the transmission data can be assessed even by adding thereto the address information indicated with the read pointer.

Figure 6:
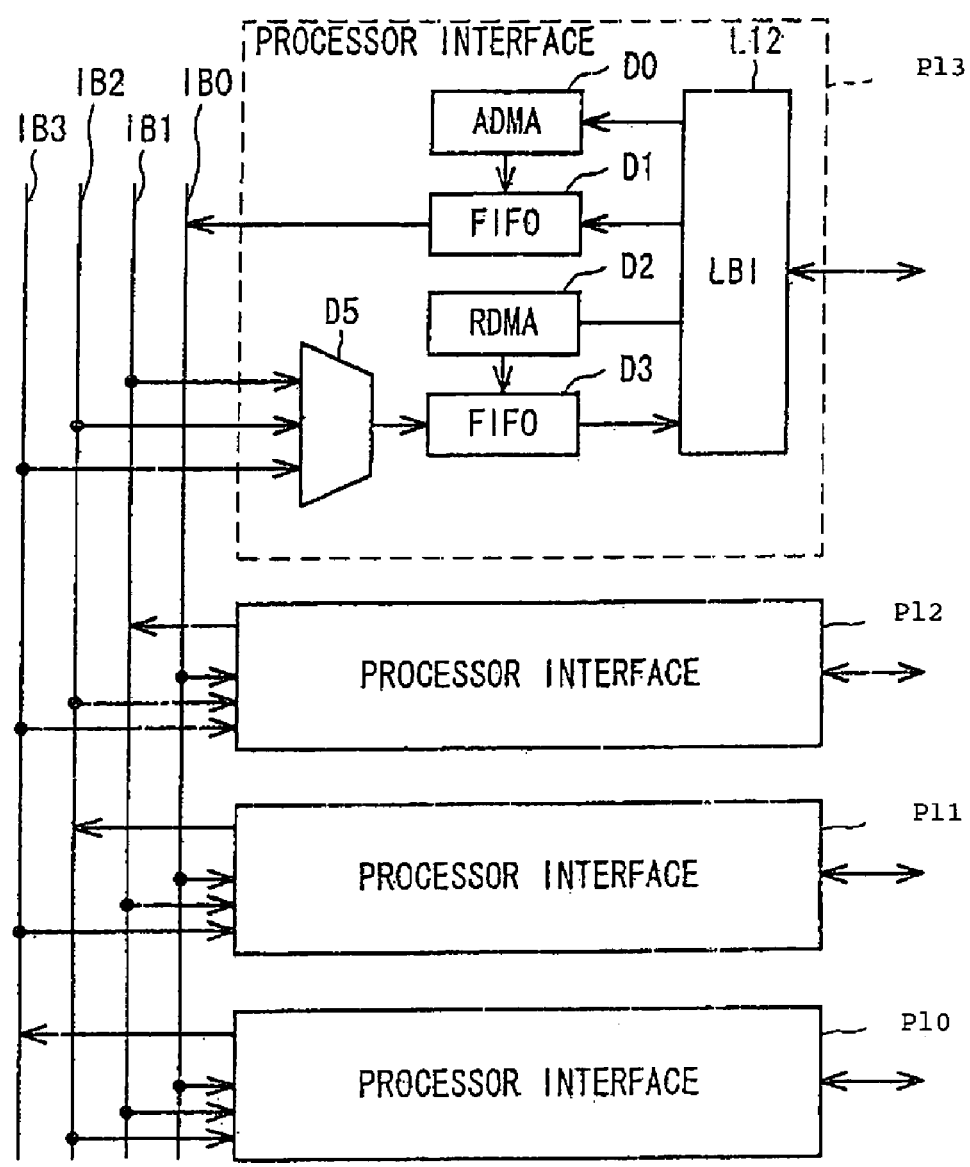
FIG. 6 is a diagram showing a configuration of an interprocessor connection unit of FIG. 2.

Now, the interprocessor connection units PC0 and PC1 (see FIG. 2) to each of which the four processor units are connected to perform data communications with each other are explained. An example of data paths of the interprocessor connection unit PC0 is indicated in AC2 of FIG. 3. FIG. 6 is a diagram showing a configuration of each of the interprocessor connection units PC0 and PC1 of FIG. 2. Referring to FIG. 6, each interprocessor connection unit comprises processor interfaces PI0–PI3 and internal buses IB0–IB3.

The processor interface PI0 is connected to the processor unit PU0 of FIG. 2 via a local bus; the processor interface PI1 connected to the processor unit PU1 of FIG. 2 via a local bus; the processor interface PI2 connected to the processor unit PU2 of FIG. 2 via a local bus; and the processor interface PI3 connected to the processor unit PU3 of FIG. 2 via a local bus.

Each processor interface comprises a local bus interface L12, a transmission DMA (Direct Memory Access) unit D0, FIFO buffer memories D1 and D3, a reception DMA unit D2, and a selector D5. The transmission DMA unit D0 and the reception DMA unit D2 have access via the local bus interface L12 to the main memory (see FIG. 1) within the processor unit. Commands to the transmission and reception DMA units D0 and D2 and transmission data are stored in respective specified regions of the memory, while a reception data storage region is reserved in the memory.

The transmission DMA unit D0 autonomously reads a data transfer command stored in the main memory, and decodes a transmission destination processor number indicating the readiness of transmission data in the memory, and a processor unit to which the transmission data is to be transmitted. Next, the transmission DMA unit D0 autonomously reads the transmission data in the memory via the local bus interface L12, and stores to the FIFO buffer memory D1. Then, in order to transmit the transmission data to the transmission destination processor unit recorded in the data transfer command, the transmission data is written via the internal bus to the FIFO buffer memory D3 of the processor interface connected to the transmission destination processor unit, while activating the reception DMA unit D2 of the transmission destination processor interface.

In the processor interface connected to the transmission destination processor unit, the activated reception DMA unit D2 autonomously reads a command indicative of a reception data storage region from the memory of the transmission destination processor unit via the local bus interface L12, and writes the transmission data read from the FIFO buffer memory D3 to the reception data storage region indicated by the command. After completing the writing of all the transmission data, the reception DMA unit D2 outputs a reception completion interrupt via the local bus interface L12 to the transmission destination processor unit, while notifying the transmission DMA unit D0 of the transmission source processor interface.

The notified transmission DMA unit D0 outputs a transmission completion interrupt via the local bus interface L12 to the transmission source processor unit, and completes the processing. Also, because the transmission DMA unit D0 and the reception DMA unit D2 are well known to those skilled in the art, the detail of its configuration is omitted.

Figure 9:
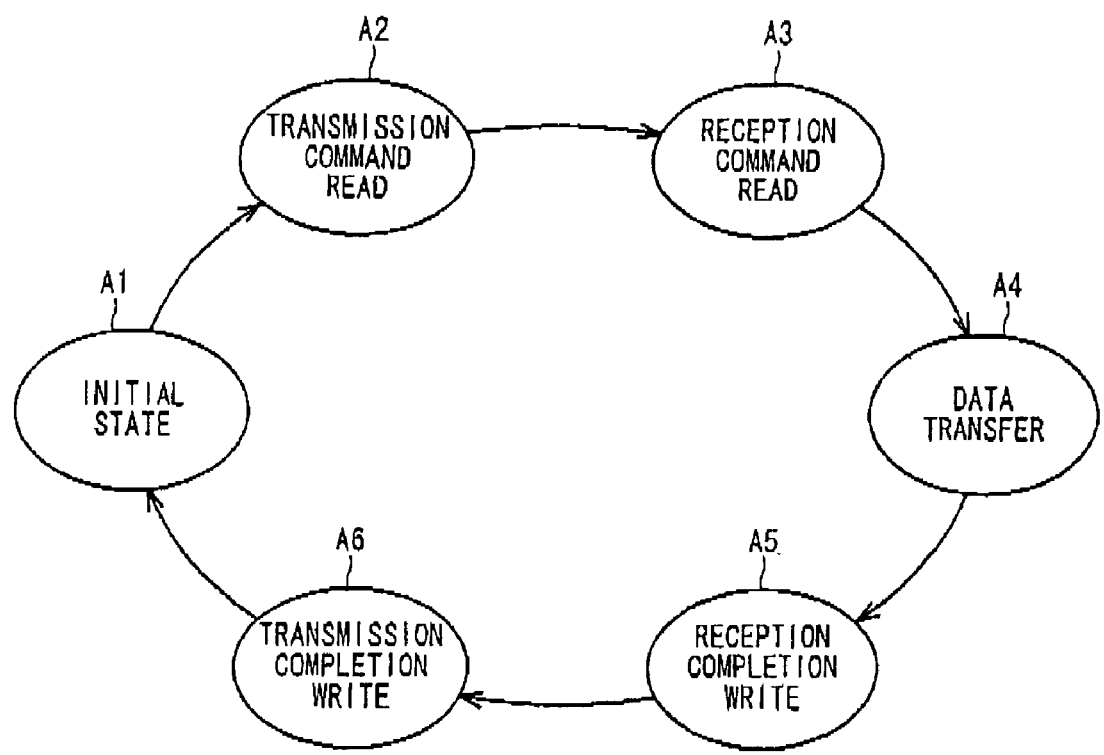
FIG. 9 is a state transition diagram of the interprocessor connection unit of FIG. 6.

FIG. 9 is a state transition diagram of the interprocessor connection unit of FIG. 6. With the aid of this state transition diagram, operation of the interprocessor connection unit of FIG. 6 is explained. Also, the state transition diagram of FIG. 9 shows a clockwise operation from an initial state A1. Referring to FIGS. 9 and 6, the transmission DMA unit D0 is activated in the initial state A1, and performs a transition to a transmission command read state A2. The transmission DMA unit D0 autonomously reads a data transfer command from the memory of the processor unit connected via the local bus interface L12, and on the basis of the data transfer command, reads transmission data from the transmission data storage region of the memory, and transfers it to the FIFO buffer memory D3 of the processor interface connected to the transmission destination processor unit, while activating the reception DMA unit D2 of the processor interface connected to the transmission destination processor unit.

This causes a transition of the state of the interprocessor connection unit to a reception command read state A3. The reception DMA unit D2 autonomously reads a reception command indicative of a reception data storage region from the memory of the transmission destination processor unit. Next, the reception DMA unit D2 performs a transition to a data transfer state A4, reads data of the FIFO buffer memory D3, and on the basis of the reception data storage region indicated by the command, writes the transmission data to the memory of the transmission destination processor unit.

After completing all the writing, the reception DMA unit D2 performs a transition to a reception completion write state A5, writes a reception completion notification to the reception command region of the memory of the transmission destination processor unit, and outputs a reception completion interrupt to the transmission destination processor unit. Next, the transmission DMA unit D0 performs a transition to a transmission completion write state A6, writes a transmission completion notification to the data transfer command region of the memory of the transmission source processor unit, and outputs a reception completion interrupt to the transmission source processor unit. Thus, a series of state transitions is complete, and performs a transition to the initial state A1.

Accordingly, even in the case of a large amount of data communications between the processor units on the same card, the communications between the processor units are enabled without burdening the processor capability, not by direct writing from one processor unit to the memory of the other processor unit on the same card, but by writing the data transfer command and the transfer data to the self-memory.

Figure 7:
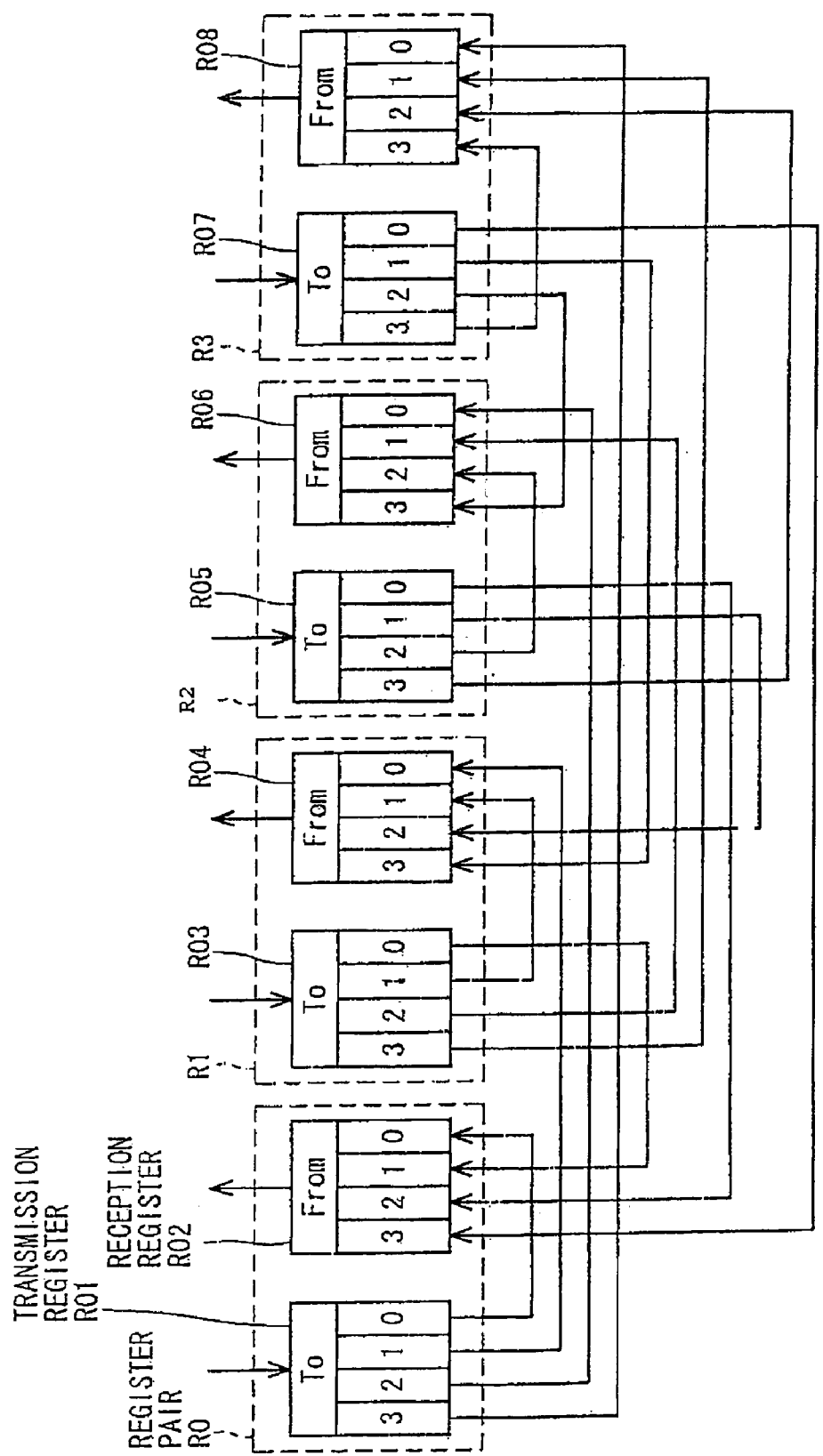
FIG. 7 is a diagram showing a configuration of an interprocessor connection unit of FIG. 2.

The communications between the processor units, explained using FIG. 6, are used especially in the case of a large amount of data communications. FIG. 7 shows a configuration used in the case of a small amount of data communications between the processor units on the same card. FIG. 7 is a diagram showing a configuration of each of the interprocessor connection units PC0 and PC1 of FIG. 2.

Referring to FIG. 7, each interprocessor connection unit comprises a register pair R0 with a transmission register R01 and a reception register R02, a register pair R1 with a transmission register R03 and a reception register R04, a register pair R2 with a transmission register R05 and a reception register R06, and a register pair R3 with a transmission register R07 and a reception register R08.

The transmission and reception registers R01 and R02 are connected to the processor unit PU0 of FIG. 2; the transmission and reception registers R03 and R04 connected to the processor unit PU1 of FIG. 2; the transmission and reception registers R05 and R06 connected to the processor unit PU2 of FIG. 2; and the transmission and reception registers R07 and R08 connected to the processor unit PU3 of FIG. 2. Also, the configurations shown in FIGS. 7 and 6 are independent of each other.

The region of each transmission register is divided for each of the four transmission destination processor units PU0, PU1, PU2, and PU3. Also, the region of each reception register is divided for each of the four transmission source processor units PU0, PU1, PU2, and PU3. Data is written to a divided region of a transmission register by a processor unit connected thereto, and is written to a divided region of a reception register connected to a processor unit indicated by the region of the transmission register (i.e. written to a region indicative of the processor unit connected to the transmission register).

As one example, consider the case of a small amount of flag data transmission from the processor unit (PU0) PU00 on the 0-sytem processor card in FIG. 3 to the processor unit (PU2) PU02 on the 0-sytem processor card. In FIGS. 7 and 3, flag data is written to the region To 2 of the transmission register R01 by the processor unit PU00, and written via the arrow route in FIG. 7 to the region From 0 of the reception register R06 connected to the processor unit PU02.

Thus, flag data is written in a transmission register while designating a transmission destination processor unit, and the flag data is written to a region indicative of a transmission source processor unit in a reception register connected to the transmission destination processor unit. Although interrupt communications are also enabled in the same manner as the above flag communications, the interrupt communications are generally an urgent case, and therefore the transmission destination processor unit clears an interrupt factor bit written to the reception register, thereby clearing the bit written to the transmission register connected to the transmission source processor unit.

As described above, a small amount of data communications such as flag and interrupt communications are performed between processor units on the same card by using transmission and reception registers whose respective regions are divided into regions indicative of the respective processor units on the same card, so that the small amount of data communications between the processor units on the same card are enabled by simple processor write and read commands, which facilitates software development. Also, since the region of each register is divided for each processor unit, no storage regions of transmission destination and source addresses are required, so that efficient data transfer is enabled with less hardware.

Now, the input/output switching units IC0 and IC1 of FIG. 2 are explained. An example of data paths is shown in AC3 of FIG. 3 where the 0-system processor cards C0 is an active system, while the 1-system processor cards C1 is a standby system. FIG. 1 is a diagram showing a configuration of each of the input/output switching units IC0 and IC1 of FIG. 2.

Figure 8:
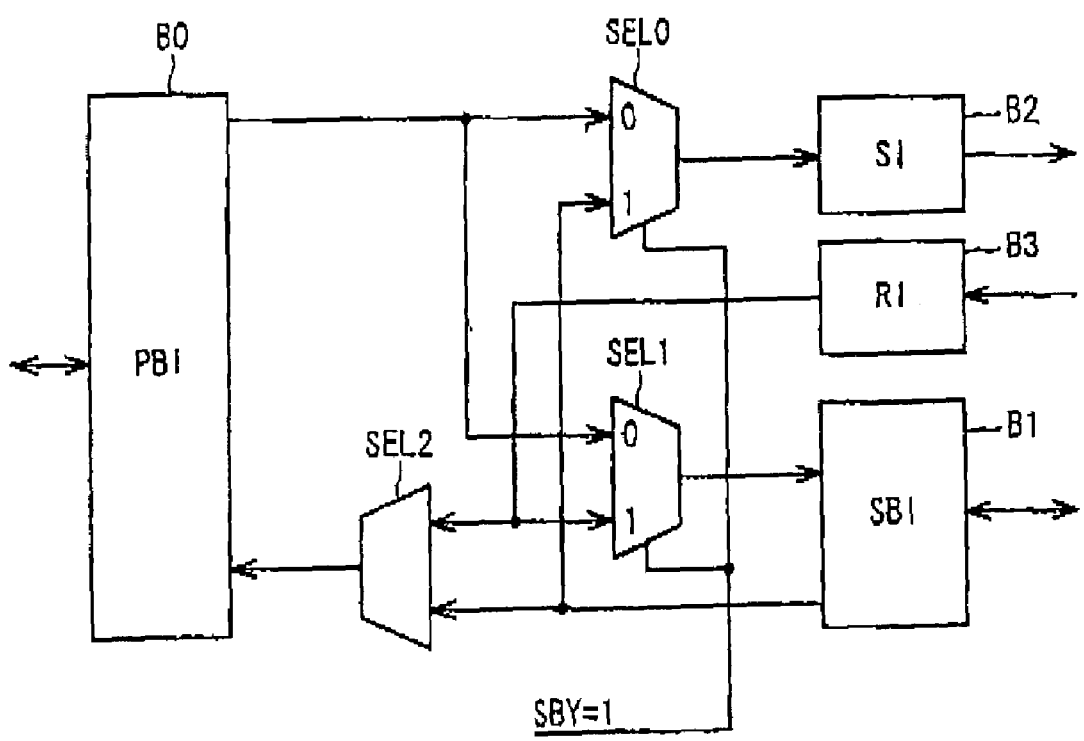
FIG. 8 is a diagram showing a configuration of an input/output switching unit of FIG. 2.

In FIGS. 8 and 2, each input/output switching unit comprises a primary bus interface B0 connected via a primary bus to the processor unit PU0 of the self system, a secondary bus interface B1 connected via a secondary bus to the input/output interface unit of the self system, a serial transmission interface B2 connected via a serial link to the input/output switching unit of the other system, a serial reception interface B3 connected via a serial link to the input/output switching unit of the other system, and selectors SEL0, SEL1, and SEL2.

Each input/output switching unit switches the input data paths according to the operating states (active and standby states) of the processor card equipped therewith. The data paths shown in AC3 of FIG. 3 are enabled by the selection operation of the selectors SEL0 and SEL1 according to the operating states of the processor card. The selection operation of the selectors SEL0 and SEL1 is controlled by a select control signal indicative of an operating state: The select control signal SBY=0 indicates the active state, while the select control signal SBY=1 indicates the standby state. The selector SEL2 involves arbitration, and operates at all times in the active system, while being inactive in the standby system.

Input data from the processor unit PU0 of the self system is input via the primary bus interface B0 to the selectors SEL0 and SEL1. Also, input data from outside of the system is input via the secondary bus interface B1 to the selectors SEL0 and SEL2. Also, input data from the input/output switching unit of the other system is input via the serial reception interface B3 to the selectors SEL1 and SEL2.

First, in the case where the processor card equipped with the input/output switching unit is the active system, the processor card is in the active state SBY=0, so that the selector SEL0 selectively outputs the input data from the processor unit PU0 of the self system. Accordingly, the input data from the processor unit PU0 of the self system is output to the input/output switching unit of the other system. Also, the selector SEL1 selectively outputs the input data from the processor unit PU0 of the self system. Accordingly, the input data from the processor unit PU0 of the self system is output to outside of the system.

Also, the input data from outside of the system is via the secondary bus interface B1 and the selector SEL2, arriving at the primary bus interface B0, and output to the processor unit PU0 of the self system. The input data from the input/output switching unit of the other system is via the serial reception interface B3 and the selector SEL2, arriving at the primary bus interface B0, and output to the processor unit PU0 of the self system.

On the other hand, in the case where the processor card equipped with the input/output switching unit is the standby system, the processor card is in the standby state SBY=1, so that the selector SEL0 selectively outputs the input data from outside of the system. Accordingly, the input data from outside of the system is output to the input/output switching unit of the other system. Also, the selector SEL1 selectively outputs the input data from the input/output switching unit of the other system. Accordingly, the input data from the input/output switching unit of the other system is output to outside of the system.

The configuration shown in FIG. 8 enables the data paths shown in AC3 of FIG. 3, and the duplexed input/output unit on the 0- and 1-system processor cards. Also, data path switching is enabled by the three selectors, while enabling miniaturization in circuit scale.

Also, as shown in FIG. 2, the present embodiment uses serial links S00–S04 and S10–S14 for the other system processor connection unit of each processor unit and the input/output switching unit, thereby ensuring an increase in the number of processor units on the card with less dependence on the number of terminals of each processor card, compared to parallel buses.

Figure 10:
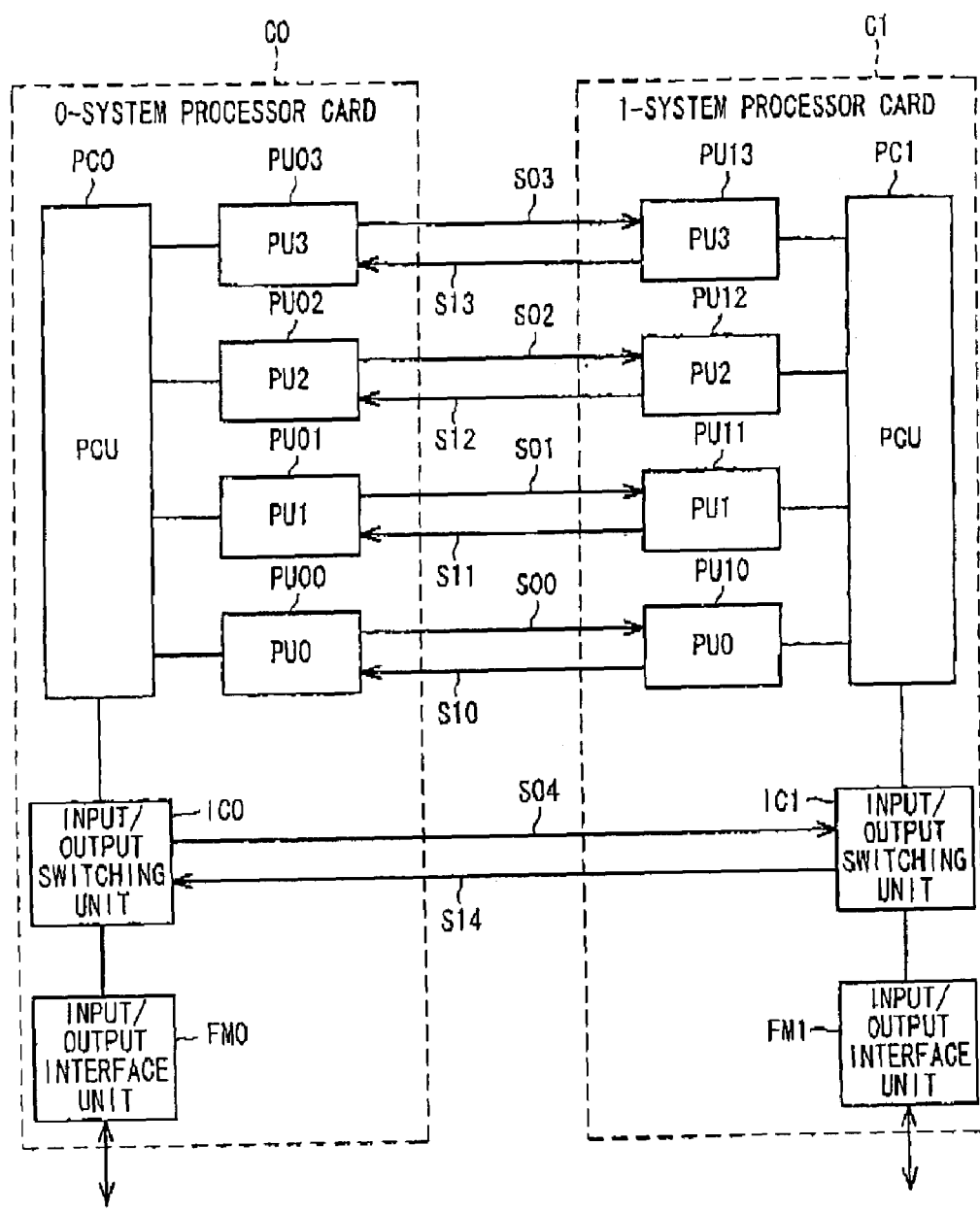
FIG. 10 is a diagram showing a configuration of a duplexed multiprocessor system in accordance with another embodiment of the present invention.

Now, another embodiment of the present invention is explained with reference to FIG. 10. FIG. 10 is a diagram showing a configuration of a duplexed multiprocessor system in accordance with another embodiment of the present invention, where the same reference characters as FIG. 2 denote like parts.

In the duplexed multiprocessor system of FIG. 2, the input/output switching units IC0 and IC1 are connected to the processor units PU00 and PU10 on the same Cards respectively, while in the duplexed multiprocessor system of FIG. 10, the input/output switching units IC0 and IC1 are connected to the interprocessor connection units PC0 and PC1 on the same cards respectively. Therefore, the duplexed multiprocessor system of FIG. 10 enables common access from each processor unit to the input/output switching units IC0 and IC1 on the same cards respectively, thereby reducing the loads of the processor units PU00 and PU10, compared with FIG. 2.

Thus, in the case where the input/output switching units IC0 and IC1 are connected to the interprocessor connection units PC0 and PC1 on the same cards respectively, one internal bus is added in FIG. 6, while connected to the primary bus interface B0 in FIG. 8.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A duplexed processor system, for transferring data between processor units each mounted in 0- and 1-system processor cards so that respective memory contents of said processor units agree with each other, wherein each of said processor units comprises:
    information addition means for adding information to transmission data to said processor unit of the other system to assess the continuity of said transmission data, wherein said information is not part of the memory contents transferred between processor units;
    information detection means for detecting said information added to reception data from said processor unit of the other system;
    notification means for transmitting a reception completion notification of said information detected by said information detection means to said processor unit of the other system; and
    transmission control means for controlling data transmission to said processor unit of the other system in response to said reception completion notification from said processor unit of the other system.

2. A duplexed processor system according to claim 1, wherein said transmission control means controls the data transmission to said processor unit of the other system, so as to retransmit missing data thereto in the case of the assessment of the presence of missing data in response to said reception completion notification from said processor unit of the other system.

3. A duplexed processor system according to claim 2, wherein:
    each of said processor units comprises memory means for storing said transmission data to said processor unit of the other system; and
    said transmission control means updates a read location of said memory means for retransmission in the case of the assessment of the absence of missing data in response to said reception completion notification from said processor unit of the other system, while reads data stored in said memory means from said read location for retransmission so that it is transmitted to said processor unit of the other system in the case of the assessment of the presence of missing data in response to said reception completion notification from said processor unit of the other system.

4. A duplexed processor system according to claim 1, wherein each of said 0- and 1-system processor cards is equipped with a plurality of said processor units, and data is transferred between each of said plurality of processor units and said processor units of the other system corresponding one-to-one therewith so that respective memory contents of these processor units agree with each other.

5. A duplexed processor system according to claim 4, wherein interprocessor communications means is provided for each of said 0- and 1-system processor cards, and autonomously transfers data between said processor units of the self-system in response to a data transfer command stored in a specified region of each respective memory of said processor units of the self-system.

6. A duplexed processor system according to claim 5, wherein said interprocessor communications means comprises:
    transfer means for being provided corresponding to each of said processor units of the self-system, autonomously reading said data transfer command stored in said memory of said corresponding processor unit, autonomously reading and transferring data stored in said memory in response to said data transfer command; and
    reception means for being provided corresponding to each of said processor units of the self-system, and autonomously writing said received transfer data to said memory of said corresponding processor unit.

7. A duplexed processor system according to claim 4, wherein a transmission register and a reception register are provided corresponding to each of said processor units of the self-system for each of said 0- and 1-system processor cards, and respective regions of said transmission and reception registers are divided in to regions indicative of said respective processor units of the self-system, and wherein data written by said processor unit to a divided region of said transmission register corresponding thereto is written to a region indicative of said processor unit that write to said transmission register said data of said reception register corresponding to said processor unit indicated by said region to which said data is written.

8. A duplexed processor system according to claim 1, wherein an input/output unit is provided for each of said 0- and 1-system processor cards, and switches paths of data input from said processor units of the self-system, said input/output unit of the other system, and outside of the system, according to operating states of said processor card of the self-system.

9. A duplexed processor system according to claim 8, wherein each of said input/output units comprises:
    selection means for selecting one input data from data input from said processor units of the self-system and from said outside of the system according to operating states of said processor card of the self-system, and outputting it to said input/output unit of the other system;
    selection means for selecting one input data from data input from said processor units of the self-system and from said input/output unit of the other system according to operating states of said processor card of the self-system, and outputting it to said outside of the system; and
    selection means for selecting one input data from data input from said outside of the system and from said input/output unit of the other system, and outputting it to said processor units of the self-system.

* * * * *